H. D. COLMAN & B. A. PETERSON.
DOFFER.
APPLICATION FILED JULY 22, 1908.

1,062,439.

Patented May 20, 1913.
7 SHEETS—SHEET 1.

H. D. COLMAN & B. A. PETERSON.
DOFFER.
APPLICATION FILED JULY 22, 1908.

1,062,439.

Patented May 20, 1913.

Witnesses:
O. F. Funk
Robert W. Weir

Inventors:
Howard D. Colman
Burt A. Peterson
By Luther L. Miller atty.

UNITED STATES PATENT OFFICE.

HOWARD D. COLMAN AND BURT A. PETERSON, OF ROCKFORD, ILLINOIS, ASSIGNORS TO HOWARD D. COLMAN, LUTHER L. MILLER, AND HARRY A. SEVERSON, COPARTNERS DOING BUSINESS AT ROCKFORD, ILLINOIS, AS BARBER-COLMAN COMPANY.

DOFFER.

1,062,439.   Specification of Letters Patent.   Patented May 20, 1913.

Application filed July 22, 1908. Serial No. 444,698.

*To all whom it may concern:*

Be it known that we, HOWARD D. COLMAN and BURT A. PETERSON, citizens of the United States, residing at Rockford, in the county of Winnebago and State of Illinois, have invented certain new and useful Improvements in Doffers, of which the following is a specification.

This invention relates to the class of doffers for spinning frames.

One of the objects of the invention is to provide a mechanical doffer for removing filled bobbins from the spindles on the spinning frame and supplying empty bobbins in place of the filled ones which have been previously removed.

Another object is to provide a doffing mechanism which may be attached to an ordinary spinning frame without materially altering the spinning frame or rearranging any operative parts thereof.

Another object of the invention is to provide a mechanical means for placing empty bobbins upon the spindle, so that the empty bobbins will hold the end of the yarn in such a manner that when the frame is started, the yarn will be laid on the empty bobbin without the necessity of the yarn being previously attached, by manual means, to the bobbin.

Other objects and advantages of this invention will become apparent by reference to the following description, read in connection with the accompanying drawings, in which:

Referring now to the drawings by numerals of reference, 15 designates the base of a ring frame, 16 is the thread guide board, 17 the thread guide, 18 the drawing rolls, 19 the bobbins containing the roving and 20 the roving to be fed to the drawing rolls. On the base 15 is a spindle rail 21. Adjacent to the spindle rail is a ring rail 22 carrying the rings 23 with thread travelers 24 in the usual manner common to a ring frame. The spindle rails are shown as provided with the usual spindle bases 25 and the whirls 26, through which the spindles 27 are driven by suitable driving mechanism.

Figure 9:
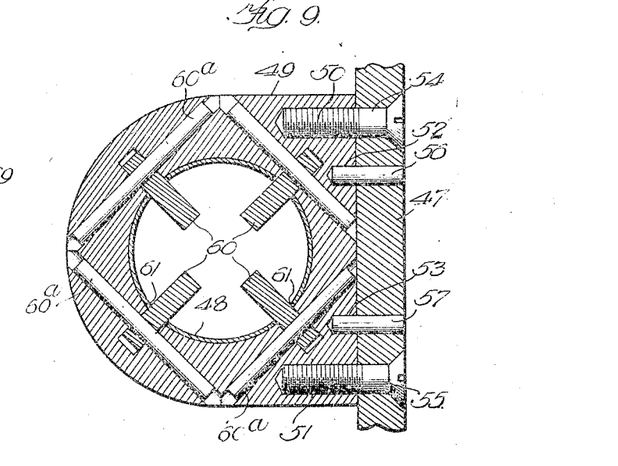
Fig. 9 is a sectional view on the line 9 9 of Fig. 8.

To the face of the spindle rail 21 is secured a horizontal doffer-supporting rail 28 provided with a groove 29 to receive the rollers 30 on the doffer carriage 31. This doffer carriage 31 consists of a substantially rectangular frame and is provided with a depending bracket 32 having a horizontal roller 33 which bears against the lower flange of the bolster rail 21. The rectangular frame 31 of the carriage is provided with a standard 34 to which is bolted or otherwise secured a guide frame comprising the side bars 35 and 36 connected at their upper ends by the yoke 37 and at their lower ends by the foot piece 38, through the medium of which said guide is fastened to the frame, as, for example, by the fastening devices 39. The standard 34 is provided with bearings 40 and 41 to receive a crank shaft 42 having an operating crank 43 keyed or otherwise secured thereto. The opposite end of the crank shaft 42 is provided with a crank 44 movable in the horizontal groove 45 of the guide bar 46 (Fig. 6) carried by the slide-plate 47, which is movable in the grooves of the bars 35 and 36. This plate 41 carries a guide or conduit for full bobbins, which guide is herein shown as consisting of a tube 48 secured to the plate 47 by the bracket 49 (best seen in Fig. 9). The bracket 49 is provided with tapped openings 50 and 51 and dowel receiving recesses 52 and 53. The openings 50 and 51 receive screws 54 and 55 which pass through the plate 47 and into the openings 50 and 51. The openings 52 and 53 receive the dowels 56 and 57, which pass through the plate 47 and engage said bracket. A somewhat similar bracket 58 is shown as being carried by the upper portion of the plate 47 and holds the doffer tube 48 fast to said plate. The bracket 49 is provided with a plurality of dog-receiving recesses 59, in which are pivoted the dogs 60 which pass through the slots 61 in the doffer tube 48 so as to be in position to engage a filled bobbin and remove it from its spindle (see Fig. 3).

The rear edge of the bracket 49 is rounded so as to reduce the liability of the thread becoming broken when the doffer tube passes over a filled bobbin preparatory to removing it. In the downward movement of the doffing tube, the rounded bracket 49 contacts the thread extending from the drawing rolls to the traveler, and by pushing against said thread the bracket 49 causes the traveler to move to the rear of the bobbin if it is not already in that position, thus preventing the thread from being caught by the doffing element and broken.

Figures 1, 6:
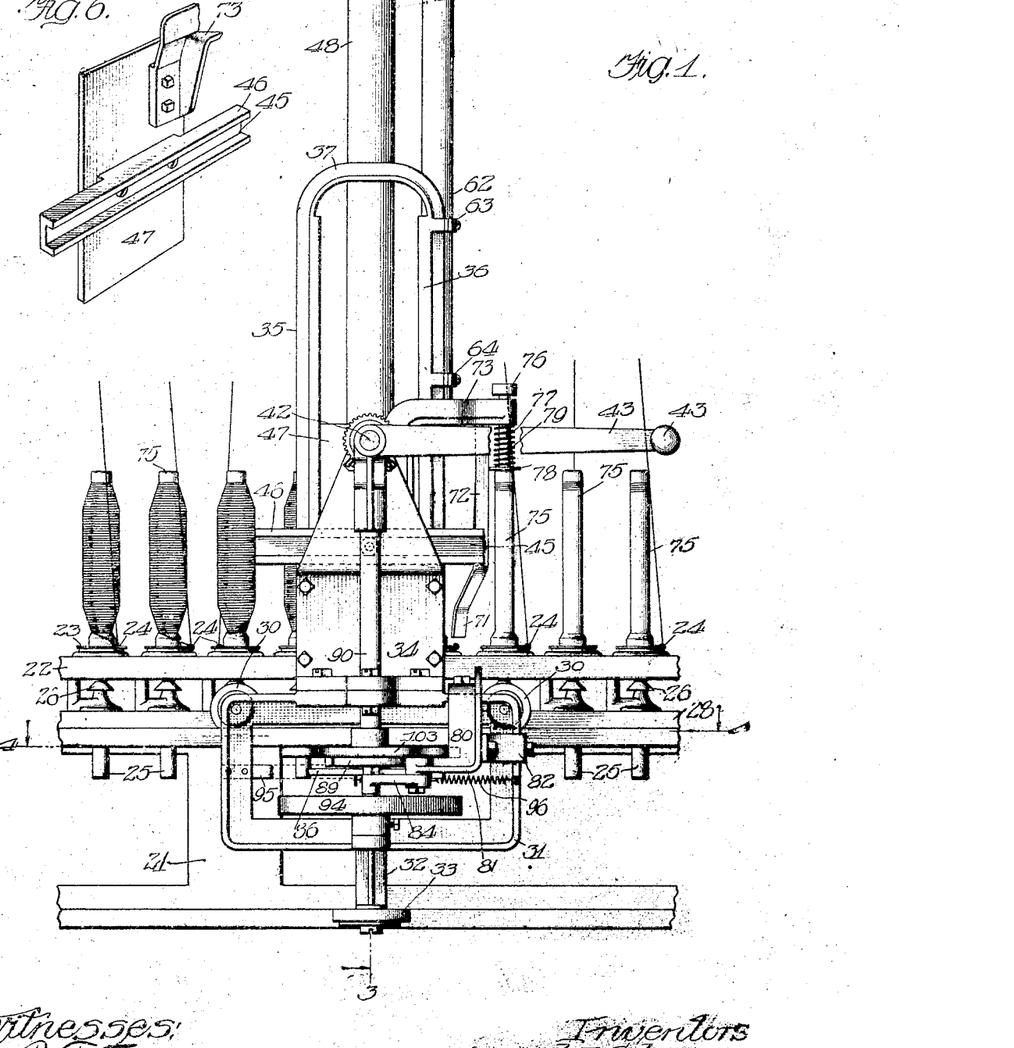
Figure 1 is a front view of a doffer constructed in accordance with our invention, part of a spinning frame being shown to illustrate the application of the device.
Fig. 6 is a detail perspective view of the slide for carrying the doffing tube, the bobbin seating plunger and the feed actuating arm.
Figure 2:
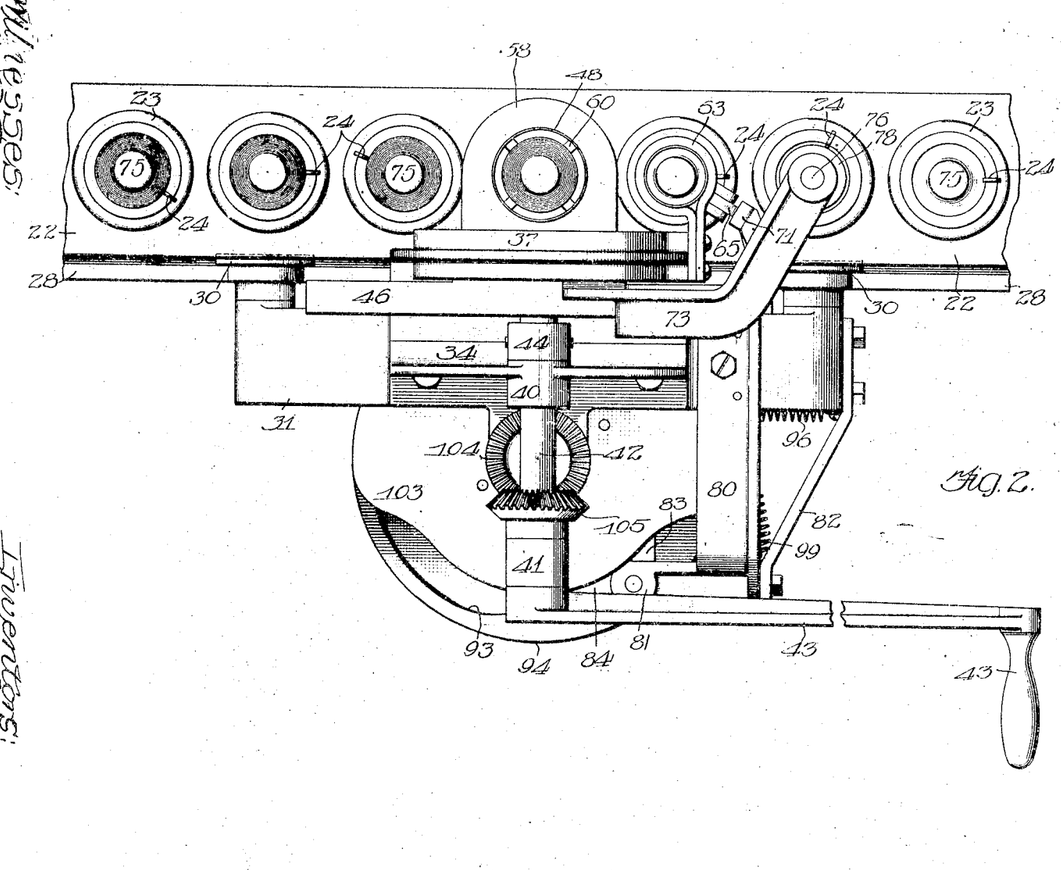
Fig. 2 is a plan view of the doffer and a part of a ring rail of the spinning frame.
Figure 7:
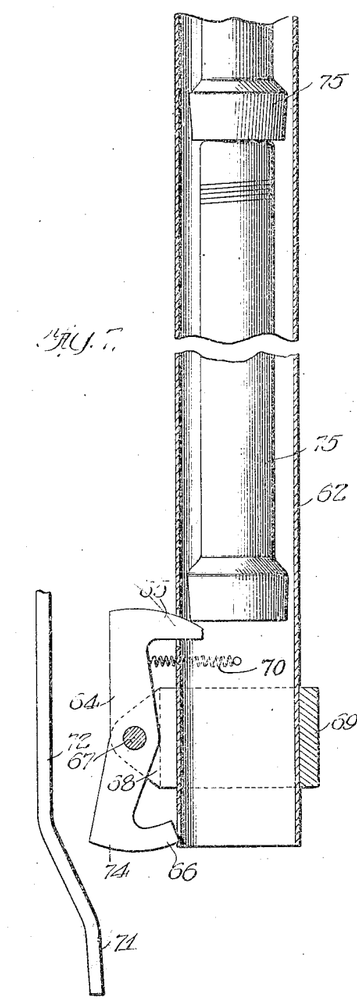
Fig. 7 is an enlarged sectional view through the bobbin feeding tube, showing the escapement device in position to prevent feeding of a bobbin, and the escapement-actuating arm in position just prior to actuating the escapement to permit the release of an empty bobbin.
Figure 8:
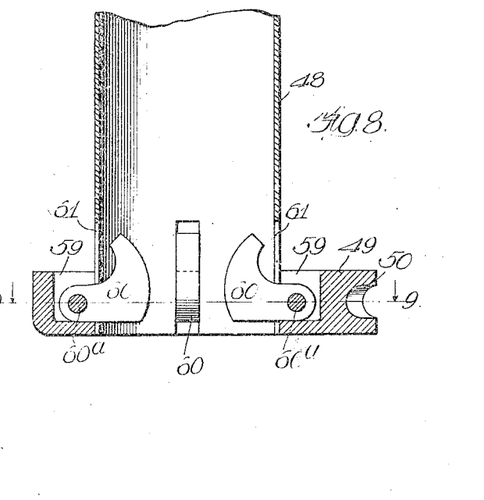
Fig. 8 is a sectional view through the base of the doffing tube.

Rigid with one of the guide bars of the guide for the plate 47 is a donning tube or supply tube 62. This supply tube is shown in Fig. 1 as being fastened to the bar 36 by straps or bands 63 and 64. Near the discharge end of the supply tube 62 (see Fig. 7) is an escapement comprising a double toothed dog 64 having an arrester tooth 65 at its upper end, and an escapement tooth 66 at its lower end. This dog 64 is pivoted between its ends, as at 67, to the lugs 68 on the band 69 carried by said tube 62. A spring 70 has a normal tendency to maintain the tooth 65 within the tube 62 and in arresting position. The tension of the spring may be overcome by the offsetted portion 71 of the escapement arm 72. The arm 72 is carried by a bracket 73 on the plate 47, therefore it will be apparent that as the tube 62 is held against vertical movement, and the arm 72 moves with the plate, the offsetted portion will contact with the heel 74 of the dog 64 on the upstroke of the arm 72 so as to swing the tooth 65 out of arresting position and permit the base of one of the bobbins 75 to drop below the tooth 65 and on to the tooth 66; where it will be held until the slide 47 begins its downward movement, carrying with it the arm 72 and moving the offsetted portion 71 out of contact with the heel 74. When this occurs, the spring 70 will restore the tooth 65 to arresting position, allowing the tooth 66 to swing out of the tube and permitting the escape or release of the base of the bobbin 75 which has been held thereby, so that the empty bobbin may be deposited upon a spindle, as will be explained hereinafter.

Figure 3:
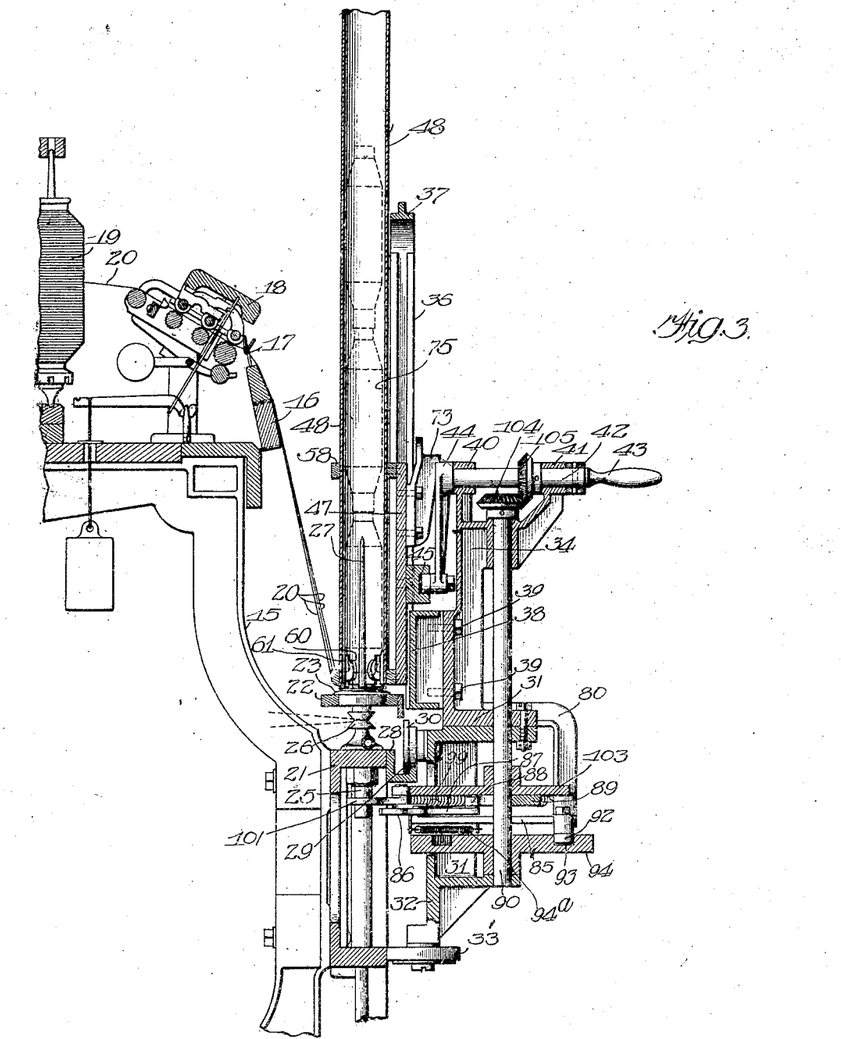
Fig. 3 is a sectional view through the doffer and a portion of a spinning frame, a roving bobbin, the drawing roll, the thread board with its thread guides, the ring rail, rings and travelers, and the spindle rail with its spindles being shown of conventional design, as they specifically form no part of this invention but are illustrated for the purpose of showing the application of our doffer.

On the end of the bracket 73 is a spring-pressed plunger 76 comprising a shank 77 slidable in the end of said bracket 73. On the lower end of said shank 77 is a head 78 normally pressed down by the expansion spring 79 which is interposed between it and the bracket 73. When the operator turns the crank 43 to raise the plate 47, movement is imparted to said plate through the crank shaft 42 and the crank 44; the doffer tube 48 moves with it so that its bottom end is above the uppermost ends of the bobbins on the spinning frame. During this upward movement, the escapement dog 64 is actuated, as has just been described, to permit the bobbin 75 to fall on the tooth 66. Continued movement of the crank shaft 42 will be effective in returning the plate 47 on its downward movement so that the doffer tube 48 will pass over a filled bobbin, the movement of which will swing the dogs 60 on their pivots 60ᵃ and cause their free ends to move through the slots 61, until they have passed over the greater diameter of the bobbin, when they will move back into position to engage the restricted lower portion of the bobbin, as shown in Fig. 3. Upon the next upward movement of the plate 47, the bobbin will be carried from the spindle, on account of the engagement therewith by the dogs 60, and will be held in said tube 48 by the dogs until the tube is again returned on the top of the next adjacent bobbin. When the tube 48 again passes down over a full bobbin the one just previously removed will be forced up into the tube on account of having its base come in contact with the upper end of the bobbin to be removed; and as the tube passes down over the new bobbin, the dogs will be effective in grasping it to lift it from its spindle upon the next upward movement of the plate. It will be seen that the bobbin-engaging means 60 yields automatically to permit said means to pass downward over a full bobbin.

It is to be remembered that each time the plate begins its downward movement, an empty bobbin is released from the supply tube 62 to be deposited upon an empty spindle from which a filled bobbin has just previously been removed.

When the plate 47 moves down, it carries with it the bracket 73 and causes the plunger head 78 to contact with an empty bobbin previously released by the tube 62 and presses down upon the upper end of said bobbin to cause it to be seated.

The axes of the tubes 48 and 62 are spaced apart a distance equal to the distance between two spindles, so that while a full bobbin is being removed, an empty bobbin may be supplied to an adjacent spindle.

Mechanism is provided for moving the carriage along the spinning frame the required distance to cause the tubes 48 and 62 to aline with the spindles.

Figure 4:
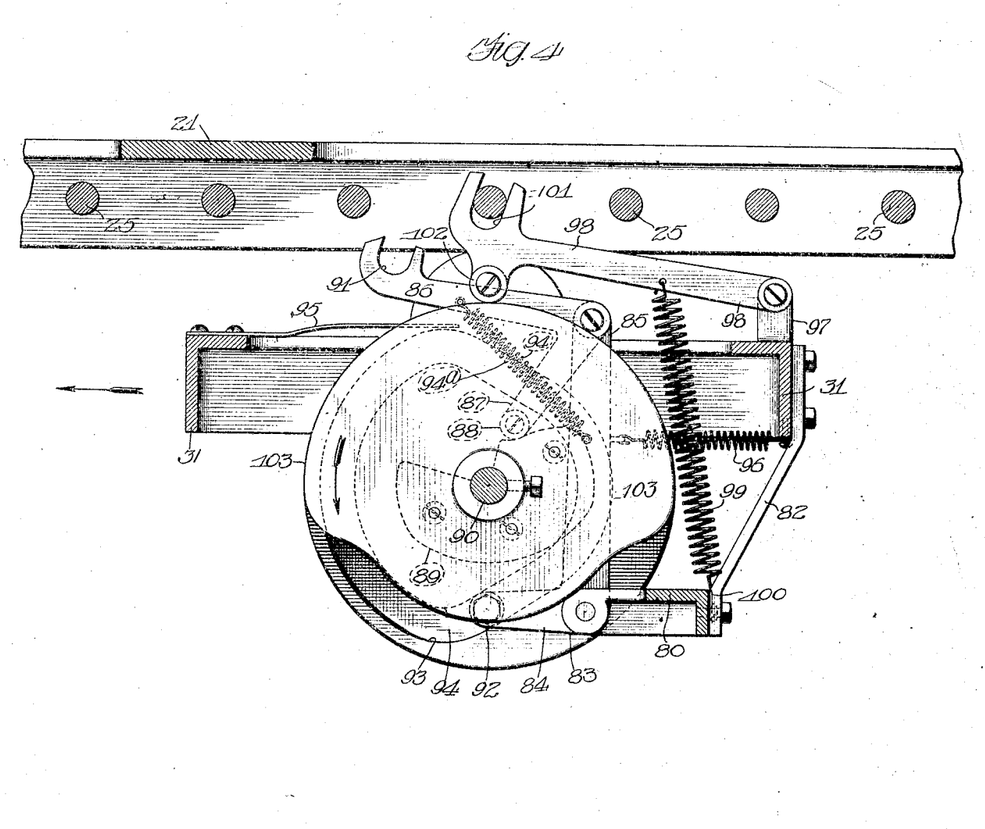
Fig. 4 is a sectional view on the line 4 4 of Fig. 1, showing the carriage of the doffer locked to a spindle base.
Figure 5:
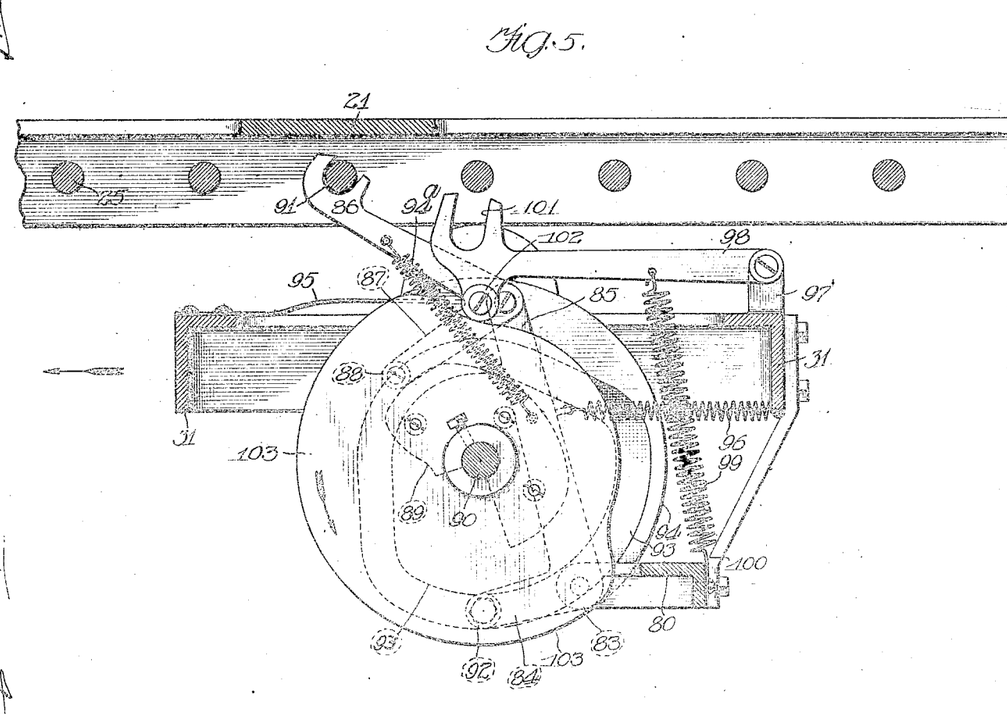
Fig. 5 is a similar view showing the carriage-actuating dog in engagement with the spindle base and the locking dog disengaged from the spindle base.

Carried by the frame 31 is a bracket 80 having a depending portion terminating in a horizontal extension 81. This bracket 80 is held in position by a brace 82 having one end fastened to the bracket 80 and the other end secured to the frame 31. Pivoted to the free end of the bracket 80 is a bell crank 83. Said bell crank is provided with a short arm 84 and a long arm 85. The long arm carries at its extremity a propelling dog 86 which is in the form of a bell crank, one arm 87 of which is provided with a roller 88 at its free end to be engaged by the periphery of a cam 89 on the cam shaft 90. The other free end of the propelling dog is provided with a notched or recessed portion 91 adapted to successively engage the base 25 of the spindles 27. The short arm 84 of the bell crank 83 is provided with a roller 92 movable in a groove 93 on the cam 94. (See Figs. 4 and 5). The cam 89 is so shaped as to give an inward and outward movement to the dog 86. The extremity of one movement is shown in Fig. 4 and the extremity of the other movement is shown in Fig. 5. The spring 94ª, connected to the dog 86 and to the long arm 85 of the bell crank 83, is for the purpose of holding the roller 88 in contact with the periphery of its actuating cam 89; but the inward movement of the dog 86 is limited by a stop 95 on the frame 31. The roller 92 on the arm 84 of the bell crank 83 is held in contact with the inner wall of the cam groove 93 by a spring 96 fastened to the long arm of said bell crank and to the frame 31; but this spring 96 may be dispensed with, if desired. A lug 97 is carried by the frame 31, and pivoted to said lug 97 is a locking dog 98 to which is connected the spring 99, one end of which engages the dog 98, and the other end of which is connected to the bracket 80 at 100. The dog 98 is provided with a spindle-base-engaging jaw 101, but said jaw 101 is normally held away from the spindle-base by the spring 99. This spring is also effective in holding the roller 102 in contact with the locking cam 103 on the cam shaft 90. The cam shaft 90 is driven by the bevel gears 104 and 105 (see Fig. 3), the former of which is on the shaft 90 and the latter on the crank shaft 42.

From the foregoing it will be apparent that the entire mechanism is driven from the crank shaft 42 and that the parts are so timed as to move in proper step to accomplish the desired results. For example: In order that the doffer tube and supply tube may move in regular sequence over the proper spindles, it is necessary that the movements of the dogs 86 and 98 be timed with relation to the movement of the doffer tube 48 and the escapement in the supply tube 62. As the shaft 42 is turned, motion is imparted to the cam shaft 90 actuating the cams 89, 94 and 103. It will be assumed that the locking dog 98 is in engagement with the base of a spindle. Upon the operation of the crank shaft 42, the cam 89 will move the jaw 91 of the dog 86 into engagement with the next adjacent spindle-base. At about the same time, the cam 103 will permit the jaw end 101 of the dog 98 to be retracted from engagement with the spindle-base by the spring 99 (see Fig. 5). When the jaw 91 of the dog 86 engages its spindle-base, the cam 89 has temporarily finished its work; that is, its periphery will move along against the roller 88 without imparting any movement to the dog 86. During this time, however, the cam 94 is acting upon the roller 92 to swing the end of the arm 84 toward the crank shaft 90. This will have a tendency to swing the end of the long arm 85 toward the lug 97. In view of the fact that the arm 85 cannot actually swing with relation to the jaw 91 of the dog 86, the whole carriage must be pulled along a distance equal to the movement imparted to the arm 84 of the bell crank 83, and this distance will be equal to the distance between the axes of two adjacent spindles. When the carriage has moved that distance, the cam 94 will cease to move the arm 84 toward the axis of the cam shaft 90 and the cam 89 will be ready to permit the release of the spindle-base by the jaw 91 of the dog 86. However, just previous to this release, the jaw 101 of the dog 98 will have been moved into locking engagement with the spindle-base just previously engaged by the jaw 91, and the periphery of the cam 103 is such that the dog 98 will be held in locking engagement with the spindle-base during the time that the offset portion 71 of the arm 72 moves out of engagement with the heel 74 of the dog 64 to drop an empty bobbin on an empty spindle, and during the operation of doffing the full bobbin.

The downward movement of the plate 47 is effective in causing the doffer tube 48 to move downward over a full bobbin and engage it near the base, ready to carry it off its spindle. The continued rotation of the shaft 42 will permit its removal and this is accomplished while the carriage is locked to the spinning frame, or as shown herein, to one of the spindle-bases. As the doffer tube is carried a slight distance above the uppermost point of the spindle, and after it has completed its doffing movement, the locking dog 98 is released from engagement with its spindle-base and the propelling dog 86 is engaged with a spindle-base so as to pull the carriage along another stated distance, pulling it along a distance equal to the distance between the two spindles.

The operation just described is repeated until all of the filled bobbins on the frame have been doffed and empty bobbins supplied to the spindles so that the spinning frame may be started again.

Figure 10:
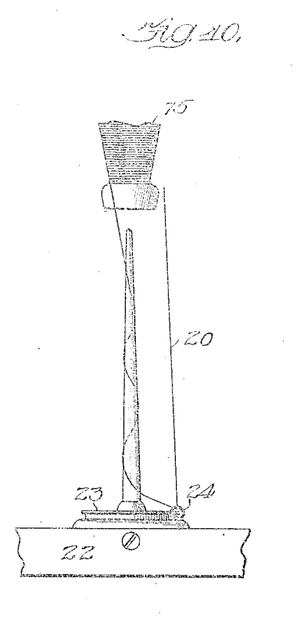
Fig. 10 is a detail view of a spindle, ring rail, ring and traveler, a full bobbin having been removed.
Figure 11:
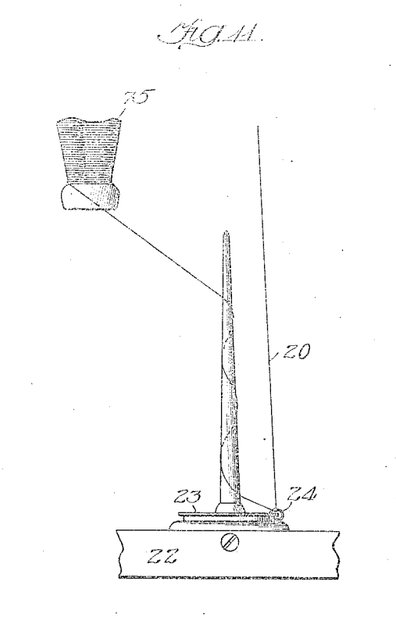
Fig. 11 is a somewhat similar view, the full bobbin being moved to one side of the spindle preparatory to supplying the spindle with an empty bobbin.
Figure 12:
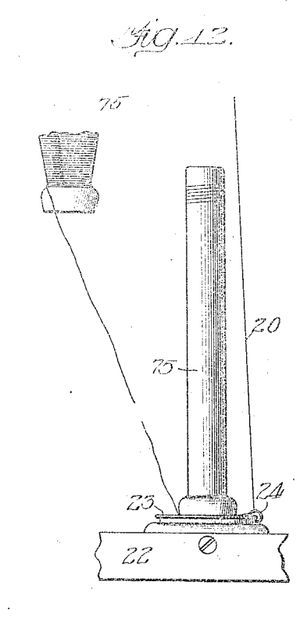
Fig. 12 is a view showing the empty bobbin seated on the spindle and a full bobbin in position to have its thread connection with the spindle broken.

The removal of a filled bobbin and the substitution of an empty bobbin will be effected in such a manner that when the spinning frame is started, the threads will be positioned to be properly laid on the bobbin in the usual manner. The manner in which this is accomplished is best shown in Figs. 10, 11 and 12, from which it will be apparent that it will not be necessary to manually attach the thread to the empty bobbins before starting up the spinning frame.

In order to use the doffing mechanism herein described in connection with an ordinary spinning frame, it will be only necessary to fasten the supporting bar 28 to the spindle rail, as seen in Fig. 3, and hang the doffing machine thereto by the rollers 30, permitting the roller 33 to bear against the vertical face of the lower portion of the spindle rail. Before the doffing operation begins, the thread board 16 should be swung up out of the way, as shown in Fig. 3. After the doffing has been effected, the machine may be readily removed and hung on another spinning frame which is ready to be doffed.

The doffing tube 48 may terminate in a flexible tube in communication with a box or suitable receptacle carried along by any appropriate means with the carriage 31, so that the doffed bobbins may be deposited therein.

It will be seen that the bobbin-engaging means 60 moves downward over a full bobbin, then upward to lift the bobbin from its spindle, and then forward into vertical alinement with the next full bobbin. No special movement of the bobbin-engaging means for the purpose of discharging the doffed bobbin is necessary because a guide or discharge conduit 48 for full bobbins is associated with the bobbin-engaging means, and because in the downward movement of the engaging means the doffed bobbin is carried into contact with the next bobbin to be doffed, and thereby pushed out of or along said guide or conduit.

The tube 62 may be supplied by any suitable means so that it will have enough empty bobbins therein to supply the empty spindles as the carriage passes along the spinning frame.

We claim as our invention:

1. In a doffer for spinning frames, a framework, reciprocatory means for engaging a full bobbin, and a guide movable with said engaging means and with relation to said framework, for conducting doffed bobbins away from said engaging means.

2. In a doffer for spinning frames, reciprocatory means adapted to embrace and engage a full bobbin, and a conduit alined with said engaging means for conducting the engaged bobbins away from said engaging means.

3. In a doffer for spinning frames, reciprocatory means adapted to embrace and engage a full bobbin, and a conduit alined with said engaging means and reciprocable therewith for conducting the engaged bobbins away from said engaging means.

4. In a doffer for spinning frames, a carriage; bobbin-engaging means mounted on the carriage and reciprocable vertically with relation to the carriage in the vertical plane of the bobbin spindles, said engaging means being automatically yieldable to permit the engaging means to pass downward over a bobbin, and a guide movable with said engaging means to receive bobbins engaged by said engaging means and conduct them away from said engaging means.

5. In a doffer for spinning frames, bobbin-engaging means, means for vertically reciprocating said engaging means in the vertical plane of the bobbin spindles, said engaging means being automatically yieldable to permit the engaging means to pass downward over a bobbin, a bobbin conduit alined with and movable with said engaging means to receive bobbins engaged by said engaging means and conduct them away from said engaging means, and means for giving said engaging means and conduit an intermittent advancing movement to bring them into vertical alinement with successive spindles on the spinning frame.

6. In a doffer for spinning frames, a slide supported for vertical reciprocation, bobbin-engaging means on said slide, a bobbin-conduit alined with said engaging means and mounted on said slide, and means for vertically reciprocating said slide comprising a horizontal shaft, a crank on said shaft, and a horizontal guide bar secured to said slide and slidably engaged by said crank.

7. In a doffer for spinning frames, a structure arranged to be supported for movement along a spinning frame, a slide mounted in said support for vertical reciprocation, bobbin-engaging means mounted on said slide, a donning tube stationarily fixed to said structure at one side of the path of movement of the slide, and a bobbin-seating plunger arranged to be moved by said slide, said bobbin-engaging means, donning tube and bobbin-seating plunger being spaced apart at distances equal to the distance between two adjacent spindles.

8. In a doffer for spinning frames, a doffing means, a donning means, and a bobbin-seater, said devices being arranged side by side with the donning means between the other two, and spaced apart at distances equal to the distance between two adjacent spindles on the spinning frame, means for actuating said devices, means for supporting said devices for movement along a spinning frame, and means for giving said devices an intermittent advancing movement to bring them into vertical alinement with successive spindles on the spinning frame, each advancing movement of said devices being equal to the distance between two adjacent spindles.

9. A doffer comprising operating mechanism, and means adapted to engage the spindle-bases of a spinning frame for propelling said mechanism along the front of the spinning frame.

10. A doffer mechanism for spinning frames, comprising a movable carriage, means on the carriage for removing full bobbins from the spindles, means upon the carriage for supplying empty bobbins to the empty spindles, spindle-base engaging means for propelling the carriage along the spinning frame, and spindle-base engaging means for locking the carriage against movement.

11. The combination, with a spinning frame, of a doffer carriage, a bell-crank lever mounted on said carriage, a propelling dog pivoted to one arm of said bell-crank lever, means acting on the other arm of said bell-crank lever to swing said lever, and means acting on said dog to move the same into and out of engagement with a part on the spinning frame.

12. The combination, with a spinning frame, of a doffer carriage; a bell-crank lever mounted on said carriage; a propelling dog pivoted to one arm of said bell-crank lever; a cam engaging the other arm of said bell-crank lever to swing said lever; a cam acting on said dog to move the same into engagement with a part on the spinning frame; and a spring for moving said dog out of engagement with said part.

13. The combination, with a spinning frame, of a doffer carriage; a bell-crank lever mounted on said carriage; a propelling dog pivoted to one arm of said bell-crank lever; a cam acting on the other arm of said bell-crank lever to swing said lever; a cam acting on said dog to move the same into engagement with a part on the spinning frame; a spring for moving said dog out of engagement with the part on the spinning frame; a locking dog pivoted on said carriage; a cam for moving said locking dog into engagement with a part on the spinning frame; a spring for moving said locking dog out of engagement with said part; and an actuating shaft on which all of said cams are fixed.

14. A spinning frame having a bolster rail comprising an upper flange and a lower flange, in combination with an angular rail attached to the upper flange, and a doffer having a roller running upon said angular rail for carrying the weight of the doffer and preventing tilting displacement of the doffer in one direction, said doffer also having a roller bearing against the lower flange of the bolster rail for preventing tilting displacement of the doffer in one direction.

HOWARD D. COLMAN.
BURT A. PETERSON.

Witnesses:
LUTHER L. MILLER,
LOUISE A. CULVER.